United States Patent
Ha et al.

(10) Patent No.: US 10,747,872 B1
(45) Date of Patent: Aug. 18, 2020

(54) SYSTEM AND METHOD FOR PREVENTING MALWARE EVASION

(71) Applicant: FireEye, Inc., Milpitas, CA (US)

(72) Inventors: Phung-Te Ha, Dublin, CA (US); Min Li, Newark, CA (US)

(73) Assignee: FireEye, Inc., Milpitas, CA (US)

( * ) Notice: Subject to any disclaimer, the term of this patent is extended or adjusted under 35 U.S.C. 154(b) by 105 days.

(21) Appl. No.: 15/717,547

(22) Filed: Sep. 27, 2017

(51) Int. Cl.
*G06F 9/455* (2018.01)
*G06F 21/53* (2013.01)
(Continued)

(52) U.S. Cl.
CPC ............ *G06F 21/53* (2013.01); *G06F 9/4406* (2013.01); *G06F 9/45558* (2013.01);
(Continued)

(58) Field of Classification Search
CPC ...... G06F 21/53; G06F 9/45558; G06F 21/54; G06F 9/4406; G06F 13/4282; G06F 2221/034; G06F 2009/45579; G06F 2009/45587; G06F 2213/0026; H04L 63/145

See application file for complete search history.

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 A 1/2008
GB 2490431 A 10/2012
(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.

(Continued)

*Primary Examiner* — Farid Homayounmehr
*Assistant Examiner* — Zhimei Zhu
(74) *Attorney, Agent, or Firm* — Rutan & Tucker LLP

(57) ABSTRACT

A computerized method that assists in preventing malware from evading detection through analysis of the virtual hardware components operating within a malware detection system is described. First, a virtual machine (VM) is provisioned in accordance with a guest image, which includes a guest operating system and one or more virtual hardware component. The virtual hardware component including an identifier, and the guest operating system includes a software driver that controls access to the virtual hardware component and features the identifier of the virtual hardware component. Responsive to processing an object within the VM and issuance of a request for an identifier of a hardware component, the identifier of the first virtualized hardware component (virtualization of the hardware component) is received. The first identifier of the first virtual hardware component being an identifier substituted for a prior identifier of the first virtual hardware component before creation of the guest image.

24 Claims, 6 Drawing Sheets

(51) Int. Cl.
*G06F 9/4401* (2018.01)
*G06F 21/54* (2013.01)
*H04L 29/06* (2006.01)
*G06F 13/42* (2006.01)

(52) U.S. Cl.
CPC .......... *G06F 13/4282* (2013.01); *G06F 21/54* (2013.01); *H04L 63/145* (2013.01); *G06F 2009/45579* (2013.01); *G06F 2009/45587* (2013.01); *G06F 2213/0026* (2013.01); *G06F 2221/034* (2013.01)

(56) References Cited

U.S. PATENT DOCUMENTS

| | | | |
|---|---|---|---|
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,845,146 A * | 12/1998 | Onodera | G06F 13/122 710/2 |
| 5,960,170 A | 9/1999 | Chen et al. | |
| 5,978,917 A | 11/1999 | Chi | |
| 5,983,348 A | 11/1999 | Ji | |
| 5,996,026 A * | 11/1999 | Onodera | G06F 13/122 707/999.001 |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,500,082 B2 * | 3/2009 | Kumar | G06F 3/0614 702/182 |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |

(56) References Cited

U.S. PATENT DOCUMENTS

| | | |
|---|---|---|
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,364,639 B1 * | 1/2013 | Koryakina ......... G06F 11/1458 707/639 |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,195 B1 * | 1/2014 | Hayden ............... G06F 17/2247 715/229 |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,832,836 B2 * | 9/2014 | Thomas ............... G06F 21/566 726/24 |
| 8,839,451 B1 * | 9/2014 | Lam .................... G06F 21/10 713/193 |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,286,102 B1 * | 3/2016 | Harel .................. G06F 9/45558 |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |

(56) References Cited

U.S. PATENT DOCUMENTS

| | | |
|---|---|---|
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0120160 A1* | 6/2005 | Plouffe .............. G06F 9/45537 711/1 |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |

(56) References Cited

U.S. PATENT DOCUMENTS

| | | |
|---|---|---|
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0011444 A1* | 1/2007 | Grobman .......... G06F 9/44547 713/2 |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0162800 A1* | 7/2008 | Takashige .......... G06F 9/5077 711/104 |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0165876 A1* | 7/2010 | Shukla ............... H04L 41/0806 370/254 |
| 2010/0165877 A1* | 7/2010 | Shukla ............... H04L 41/0843 370/254 |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |

(56) References Cited

U.S. PATENT DOCUMENTS

| | | |
|---|---|---|
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0151477 A1* | 6/2012 | Sinha ............... G06F 9/45558 718/1 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0215941 A1* | 8/2012 | Brownlow ............ G06F 13/385 710/3 |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0191924 A1* | 7/2013 | Tedesco ............... G06F 21/00 726/26 |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0173071 A1* | 6/2014 | Hazen ............... H04L 63/0876 709/223 |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0161151 A1* | 6/2015 | Koryakina ............ G06F 16/128 711/114 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0339144 A1* | 11/2015 | Cao ............... G06F 9/45558 718/1 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0026469 A1* | 1/2017 | Usgaonkar .......... H04L 67/1097 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2018/0349161 A1* | 12/2018 | Jain ............... G06F 9/45537 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |

(56) References Cited

FOREIGN PATENT DOCUMENTS

| WO | 2011/084431 A2 | 7/2011 |
|---|---|---|
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

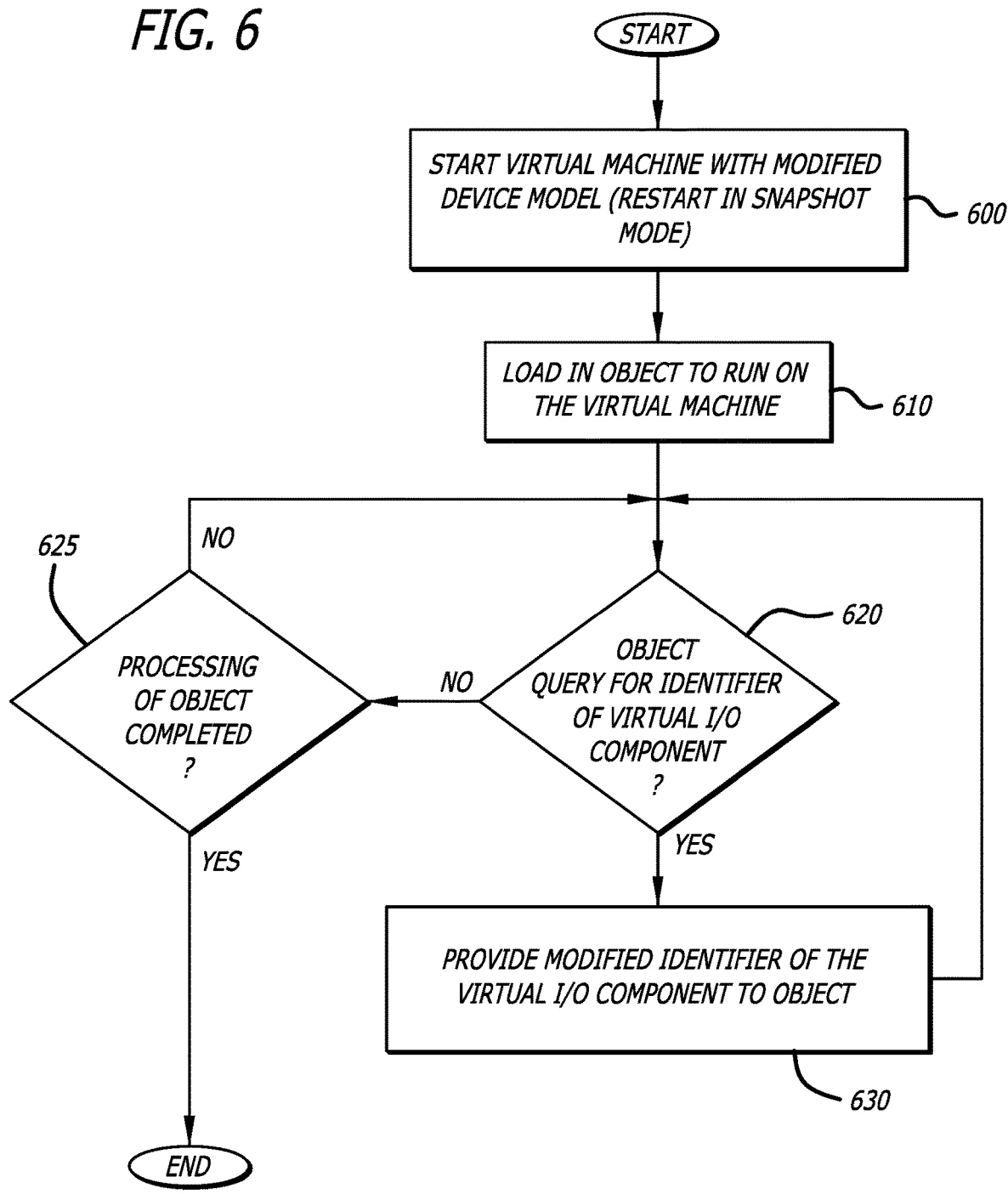

SYSTEM AND METHOD FOR PREVENTING MALWARE EVASION

1. FIELD

Embodiments of the disclosure relate to the field of cyber security. More specifically, embodiments of the disclosure relate to a system and computerized method that provides an improved, virtualized malware detection system to mitigate malware evasion therefrom.

2. GENERAL BACKGROUND

Malware detection systems often employ virtualized environments to enable suspicious objects, namely objects that are potentially malicious and may be classified as "malware," to be safely analyzed during run-time in one or more virtual machines. Each virtual machine (VM) is provisioned with a guest image, where the guest image is configured in accordance with a particular software profile. Thereafter, a suspicious object is submitted to a selected VM provisioned with a software profile suitable for processing the suspicious object type. For example, where the suspicious object is a web page, the software profile may include a browser application that operates in concert with a specific type operating system (OS). As another example, where the suspicious object is an electronic mail (email) message, the software profile may include an email application that operates in concert with the same or a different OS.

For analyzing a suspicious object for malware, a virtual machine is provisioned with a guest image including software components that, when executed, perform operations substantially similar (if not identical) to the operations performed by a corresponding physical electronic device. For some suspicious objects including certain sophisticated malware, during processing by a virtual machine, the malware may cause a software application associated with the guest image to initiate system calls that request services from the guest OS. The services may include hardware-related service (e.g., accessing external storage (e.g., a hard disk or solid state drive, accessing a network controller, etc.). The sophisticated malware can use returned data from these system calls to determine whether it is operating within a virtual environment, and if so, halt operation to evade detection.

More specifically, certain malware has been designed to evade operation in virtualized environments by issuing one or more system calls for hardware-related services. The system call(s) cause the guest OS to obtain and return identifiers for certain components (e.g., input/output "I/O" controllers, etc.) within a network device processing an object (e.g., executable, document, etc.) infected with the malware. Based on these returned identifiers and the knowledge that certain I/O controllers are commonly used in malware detection systems, the malware may determine, with reasonable accuracy, whether or not the malware is operating within a virtualized environment. More specifically, by aggregating the returned identifiers and determining whether most, if not all, of these identifiers are associated with I/O controllers or other types of I/O devices commonly virtualized and used by malware detection systems, malware can evade detection by delaying operability.

Conventional malware detection systems are unable to curtail the above-identified evasion technique because virtualizing newly released I/O devices, especially I/O devices manufactured by another company, is extremely complex and costly. Virtualization of an I/O device requires a substantial amount of time to complete. In addition, even though new virtualized I/O devices are implemented, the malware can quickly hamper conventional malware detection by simply updating its target device database and recognizing the newly added device identifiers as a standard component of a virtualized environment.

BRIEF DESCRIPTION OF THE DRAWINGS

Embodiments of the invention are illustrated by way of example and not by way of limitation in the figures of the accompanying drawings, in which like references indicate similar elements and in which:

FIG. 6 is an illustrative embodiment of the operations conducted by the virtual machine of FIG. 4 operating as part of the malware detection system of FIG. 1 and responding to malware analyzing the execution environment.

DETAILED DESCRIPTION

Figure 1:
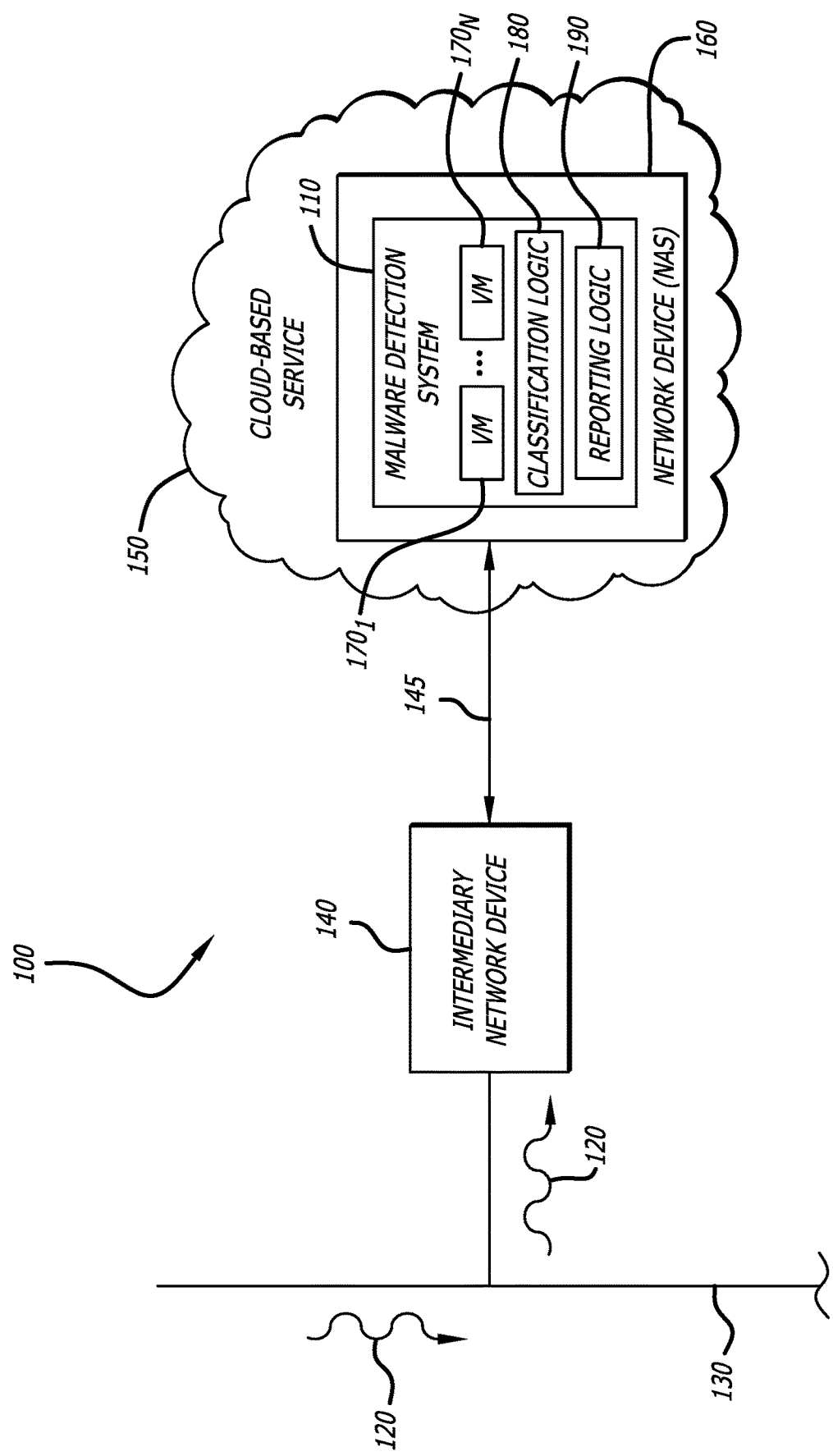
FIG. 1 is an exemplary block diagram of a system deploying a virtualized malware detection system.

Various embodiments of the disclosure relate to a malware detection system configured to counter specific attempts by sophisticated malware present within an object under analysis in (i) determining whether the malware is being analyzed within a virtual environment, and if so, (ii) performing operations to evade detection. Previously, evasion was achieved by malware, upon activation within a network device, attempting to identify certain component combinations of the network device. Upon identifying a component combination that corresponds to a virtual component combination commonly used by malware detection systems, the malware would conclude that it is being analyzed in a virtual environment. In response, the malware took evasion actions to avoid detection (e.g., terminate further operations to remain dormant or modify its behavior in an attempt to evade detection).

According to one embodiment of the disclosure, given the difficulty and substantial costs involved in attempting to virtualize newly released hardware components year after year, the malware detection system features one or more virtual machines (VMs) with specifically modified software components to counter this evasion strategy. Each of the VMs is configured with (i) at least a first virtual component, which resides in the device model (virtualization of common components associated with a network device) running on the host system of the virtual machine and is identified within the virtual machine by a modified (substituted) identifier; and (ii) at least one software driver, which resides in the guest system and controls access to the first virtual component. The software driver(s) is modified to communicate with the first virtual component, such as an input/output (I/O) virtual controller for example, using the same modified identifier. The modified identifier is selected to misrepresent to the malware the actual virtual component type (e.g., version and/or manufacturer).

More specifically, unlike physical I/O components that are permanently assigned an identifier to identify the I/O component type, a virtual I/O component may be modified to include different identifiers. Stated differently, while the virtual I/O component may be coded to function as a particular I/O component, the identifier of that virtual I/O component may be substituted so that the virtual I/O component may represent itself as a different type of I/O component. Herein, an "identifier" may correspond to any type of identification information including, but not limited or restricted to a device address, device identification (ID) such as a Peripheral Component Interconnect (PCI) ID, or any other number, character, or alphanumeric value that uniquely identifies a particular type of physical or virtual component.

According to this embodiment of the disclosure, the virtual machine includes one or more virtual I/O components each assigned with an identifier that represents a particular component type. In addition, one or more software drivers, each operating with (or as part of) a guest operating system (OS) and controlling access to a corresponding virtual I/O component, features the same identifier. As a result, in response to a virtual I/O component being modified with a new identifier, the identifier of its corresponding software driver is also modified to include the new identifier to support communications therebetween. The identifier of the virtual I/O component may be modified by changing a parameter value within the virtual I/O component source code while the identifier of the software driver may be modified by altering either an identifier in the driver source code (e.g., LINUX® OS driver) or a driver configuration (text) file accessed by the software driver (e.g., WINDOWS® OS driver).

For instance, as an illustrative example, an identifier associated with one type of I/O controller (e.g., a legacy I/O controller commonly deployed in conventional malware detection systems) may be substituted with an identifier of another type of I/O controller. The substituted identifier may correspond to an identifier uniquely assigned to a newly released I/O controller, although the actual code structure of the virtualized I/O controller may correspond to code that emulates operations of the legacy I/O controller. The substitution is made to reduce the likelihood of malware evading detection, such as detecting and either (i) suppressing or (ii) halting its operation for example, in response to detecting a presence of certain I/O components whose actual virtualization would be extremely difficult to achieve given the difficulty of timely coding virtual hardware components for a recently released or updated physical hardware component.

Thereafter, a suspicious object may be processed within a malware detection system using the software driver(s) and virtual I/O component(s) with the modified (substituted) identifier(s). During processing of the object in the malware detection system, operations of the object and/or virtual machine (hereinafter, "events") are monitored and the object is classified based as malware or not.

As an illustrative example, a cyber-attacker may deliver an object to a protected network. A network device intercepts and conducts a preliminary analysis on an incoming object to determine whether the object is "suspicious," namely exceeds a degree of likelihood of the object being malicious. Deployed as part of a cloud-based (private or public network) service, as a separate appliance, or as functionality within an endpoint device itself (generally referred to as a "network analysis system" or "NAS"), a malware detection system is configured to conduct a further analysis of the suspicious object. This analysis may involve execution of the suspicious object within a virtual machine operating as part of the malware detection system and, during execution, the events associated with operations of the suspicious object and/or operations by the virtual machine are monitored.

For instance, during execution within the virtual machine and in response to receiving a request message (e.g., system call) for an identifier of a particular component, such as an I/O controller (e.g., a network interface controller, disk controller, keyboard controller, or another peripheral controller) for example, the guest OS of the virtual machine accesses and returns an identifier of a virtual I/O controller. Although the virtual I/O controller is a virtualization of a selected (hardware) I/O controller, which may differ from the host I/O controller (physical I/O controller of the network device processing the virtual machine), the returned identifier from the virtual I/O controller may also differ from the identifier normally used to represent the virtual I/O controller. Hence, while the code controlling the functionality of the virtual I/O controller may remain the same (i.e., its functionality remains static), the identifier of the virtual I/O controller may be substituted on a periodic or aperiodic basis. This substitution may be conducted to avoid any particular type of virtual I/O component from being recognized by malware, as being part of a virtual environment.

In summary, a periodic or aperiodic substitution of an identifier of a virtual component, such as an virtual I/O component for example, represents to potential malware, upon requesting an identifier of the I/O component, a different type of virtual I/O component than actually deployed (e.g., a different manufacturer, a different model or version). This identifier change is captured in the guest image that is loaded in the virtual machine so that malware, by collecting identifiers for different I/O components, is unable to discern that it is operating within a virtual environment. This mitigates evasion of malware detection analyses by limiting the efficacy of a suspicious object evasion system within malware that may be based on hardware detection signatures (e.g., signatures of identifiers associated with known virtualized hardware within malware detection systems).

I. Terminology

In the following description, certain terminology is used to describe aspects of the invention. For example, in certain situations, the terms "component" and "logic" are representative of hardware, firmware and/or software that is configured to perform one or more functions. As hardware, a component (or logic) may include circuitry having data processing or storage functionality. Examples of such processing or storage circuitry may include, but is not limited or restricted to the following: a processor; one or more processor cores; a programmable gate array; an I/O controller (network, disk, keyboard, etc.); an application specific integrated circuit; receiver, transmitter and/or transceiver circuitry; semiconductor memory; combinatorial logic, or combinations of one or more of the above components.

A component (or logic) may be in the form of one or more software modules, such as executable code in the form of an operating system, an executable application, code representing a hardware I/O component, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. According to one embodiment, the object may be one or more communications packets. According to another embodiment, the object may be extracted from payloads of one or more communication packets. According to yet another embodiment, the object may be a document, file, executable, uniform resource locator (URL) or other data type embedded within or formed by the one or more communication packets. During analysis, for example, the object may exhibit a set of behaviors, some of which may be expected and others may be unexpected. The set of behaviors (or the unexpected behavior(s) themselves) may be systematic of the object being associated with a cyberattack or associated with malicious activity, including the object including malware.

In general, a "virtual machine" generally refers to a virtualized network device that includes an operating system (OS) and one or more applications that operate with virtualized device hardware. The virtualized device hardware may be different from the physical device hardware on which the virtualization is conducted. Virtual machines may be provisions with one or more OSes, applications, and I/O controllers intended to present to potential malware lurking within executed traffic/content an ordinary/conventional environment despite the fact that it is being executed within the malware detection system. In this regard, "ordinary" or "conventional" describes a runtime environment that is in prevalent, current use generally or specifically by an organization whose IT infrastructure is being protected by the malware detection system. In the latter regard, the provisioning should result in a VM that replicates or approximates (e.g., same types of software, sometimes with different versions) network device configurations within that organization.

A "network device" generally refers to an electronic device which network connectivity. Examples of a network device may include, but are not limited or restricted to the following: a server; a router or other signal propagation networking equipment (e.g., a wireless or wired access point); or an endpoint device (e.g., a stationary or portable computer including a desktop computer, laptop, electronic reader, netbook or tablet; a smart phone; a video-game console); or wearable technology (e.g., watch phone, etc.).

The term "transmission medium" (or "interconnect") is a physical or logical communication path to or within a network device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, an exemplary block diagram of a system 100 deploying a virtualized malware detection system 110 is shown. Herein, a cyber-attack is conducted by delivery of an object 120 to a protected network 130, which may include a public network such as the Internet, a private network (e.g., a local area network "LAN", wireless LAN, etc.), or a combination thereof. According to one embodiment of the disclosure, an intermediary network device 140 may be configured to intercept the object 120 being part of information propagating over the network 130, and thereafter, conduct a preliminary analysis on the object 120 to determine whether the object 120 is "suspicious," namely exceeds a degree of likelihood of being associated with a cyber-attack. Additionally, or in the alternative, the preliminary analysis may be conducted by static analysis logic implemented within the malware detection system 110, as described below.

According to one embodiment, the preliminary analysis may include a determinative rule-based analysis that conducts a comparison involving data related to the object 120 (e.g., data within the object 120, metadata associated with the object 120, etc.). Prior to analysis, the data related to the object 120 may be extracted from the object 120 and/or transformed into another format (e.g., creation of a hash value by any type of one-way hash operation) for comparison with contents from a black list (e.g., data associated with objects previously determined to be malicious) and/or contents from a white list (e.g., data associated with objects previously determined to be benign). The object 120 is determined to be suspicious if the data related to the object 120 fails to match contents within either the black list or the white list.

Alternatively, the preliminary analysis may include a signature check analysis by comparing at least a portion of the data related to the object 120 with one or more pre-stored signatures (pre-configured and predetermined attack patterns) from signature database (not shown). Yet another type of preliminary analysis may involve heuristics, which is based on rules or policies as applied to the object and may determine whether one or more portions of the object under analysis is associated with suspicious features.

If determined to be "suspicious" during the preliminary analysis, the object 120 may undergo a further (more-detailed) analysis to assist in classifying the suspicious object as malicious or not. Otherwise, the object 120 may be determined as malicious or benign based on the black/white list or heuristic analysis results.

As shown in FIG. 1, as deployed as part of a cloud-based (private or public network) service 150, a network device (referred to as a "network analysis system" or "NAS" 160) includes the malware detection system 110, which conducts a further analysis of the suspicious object 120. The further analysis may include a behavioral analysis that involves execution of the suspicious object 120 within one or more virtual machines $170_1$-$170_N$ (N≥1), which operates as part of the malware detection system 110.

During execution of the suspicious object 120, the events associated with operations of the suspicious object 120 and/or operations by the virtual machine $170_1$ are monitored and the object 120 is classified by object classification logic 180 as malicious or non-malicious based, at least in part, on the monitored events. Reporting logic 190 is deployed within the malware detection system 110 to transmit a message to an administrator of the network 130 that sourced the object 120. The message may identify a cyber-attack is occurring or particulars associated with the object 120 deemed to be malicious. The message may be returned to a network device associated with the administrator via intermediary network device 140 or transmitted through another communication path. The message may be sent via network interface controller $230_1$ and network transceiver $250_1$ (see FIG. 2).

Figure 2:
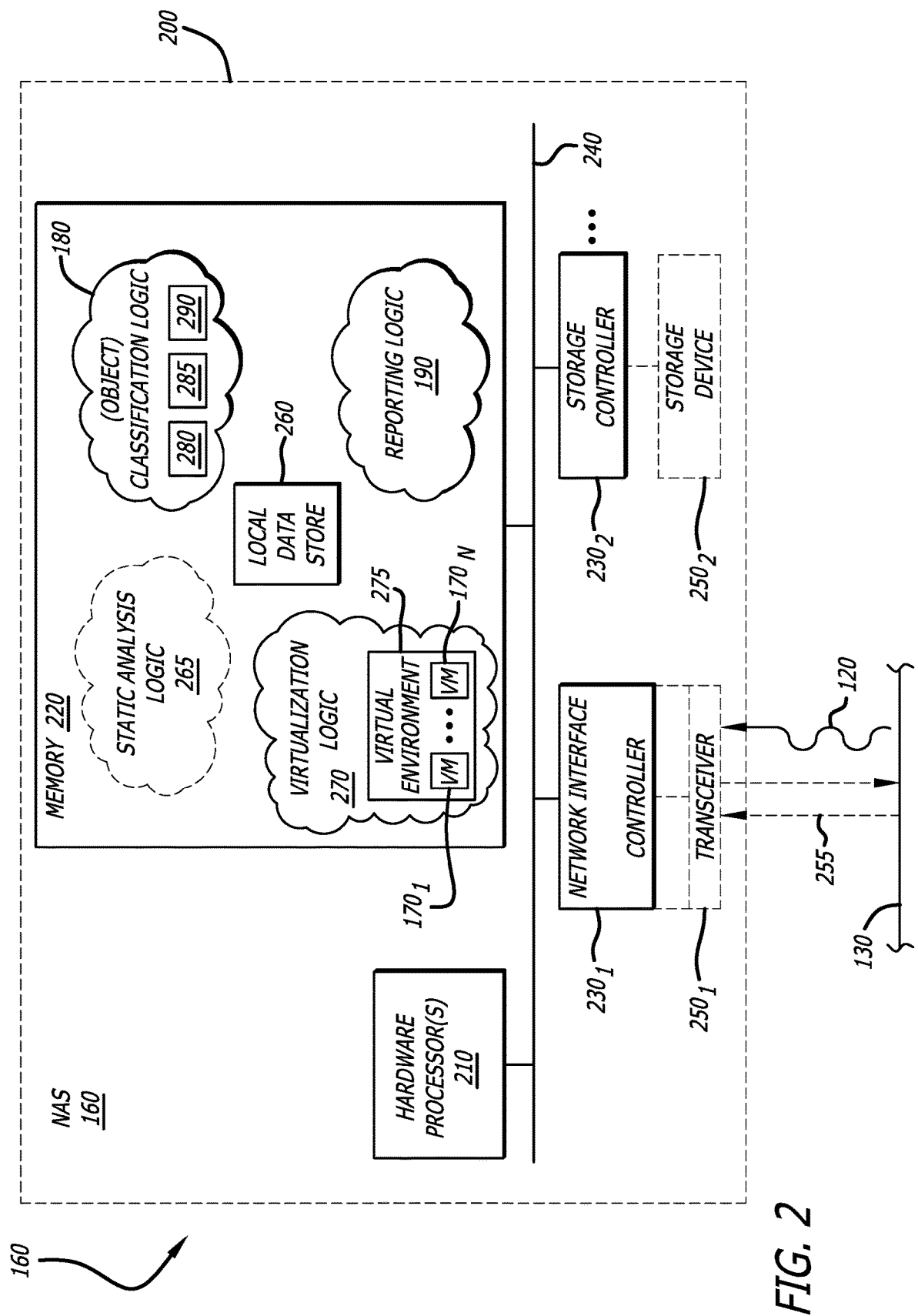
FIG. 2 is an exemplary block diagram of a network analysis system including the malware detection system of FIG. 1.

Referring to FIG. 2, an exemplary block diagram of the physical architecture of the NAS 160 of FIG. 1 is shown. Herein, according to one embodiment of the disclosure, the NAS 160 comprises at least one hardware processor 210, at least one memory 220 and one or more input/output (I/O) controllers $230_1$-$230_M$ (M≥1) communicatively coupled to a system interconnect 240 (e.g., bus). One type of I/O controller $230_1$ may correspond to a network interface controller $230_1$ that provides the NAS 160 with a dedicated connection to the network 130 via transceiver logic $250_1$ being an optional portion of the NIC $230_1$, and thus, operates as an intermediary device between the network 130 and the system interconnect 240. Another type of I/O controller $230_2$ may correspond to a storage controller $230_2$ that operates as an interface between the system interconnect 240 and a storage device $250_1$ (e.g., local drive, port for connectivity with a portable memory such as Universal Serial Bus (USB) flash drive, etc.). These hardware components are at least partially encased in a housing 200, which is made entirely or partially of a rigid material (e.g., hardened plastic, metal, glass, composite, or any combination thereof) that protects these components from atmospheric conditions.

Herein, the NAS 160 is a network device that is adapted to analyze information associated with incoming data provided over a transmission medium (e.g., data over the network 130). As shown by dashed lines 255, the NAS 160 is communicatively coupled with the network 130 via the network interface controller $230_1$, where the NIC $230_1$/$250_1$ may be coupled to the intermediary network device 140 (see FIG. 1) or may operate as a data capturing device in lieu of use of the intermediary network device 140. As a data capturing device, the NIC $230_1$/$250_1$ may be configured to receive incoming data and temporarily store the incoming data (e.g., data related to object 120). For instance, the NIC $230_1$/$250_1$ may generally operate as a network tap that receives one or more objects (e.g., object 120) extracted from network traffic propagating over the network 130 and provides the objects (or a copy thereof) into a local data store 260. Alternatively, although not shown, the NAS 160 may be configured to receive files or other types of objects, which are automatically (or on command) accessed from the storage device $250_1$. As yet another alternative, the NAS 160 may be configured to receive objects that are provided through a transmission medium other than the network 130. For instance, as an illustrative example, the NIC $230_1$/$250_1$ may be a data capturing device (e.g., port) for receiving objects manually provided via a suitable dedicated communication link or from portable storage media such as the USB flash drive or a memory card (e.g., Compact Flash card, Secure Digital "SD" card, smartcard, etc.).

In some embodiments, as shown, the I/O controllers $230_1$-$230_M$ are positioned as part of the NAS 160. For example, the I/O controllers $230_1$-$230_M$ may include one or more network ports containing the mechanical, electrical and/or signaling circuitry needed to connect the NAS 160 to the network 130. To that end, the I/O controllers $230_1$-$230_M$ may be configured to transmit and/or receive messages using a variety of communication protocols including, inter alia, File Transfer Protocol (FTP), TCP/IP, User Datagram Protocol (UDP), Hypertext Transfer Protocol (HTTP), Internet Message Access Protocol (IMAP), Simple Mail Transfer Protocol (SMTP), or the like.

In other embodiments, the functionality of certain I/O controllers $230_1$-$230_M$ could be at least partially integrated into the intermediary device 140 (e.g., a firewall, router, switch or other networked electronic device), which resides within the communication path from the network 130 to the NAS 160. As shown in FIG. 1, the intermediary device 140 can be a standalone component, such as an appropriate commercially available network tap.

It is contemplated that metadata associated with the object 120 for analysis may be provided before submission of the object 120 or may accompany the object 120 at the time of submission to the NAS 160. According to one embodiment of the disclosure, the metadata may be used, at least in part, to determine protocols, application types and other information that identifies features of the object 120 under analysis. The metadata may be used by logic within the NAS 160 to select one or more software (guest) images that correspond to and include a particular software profile and which virtual machine(s) of the virtual environment are selected to be active or inactive.

The memory 220 may include a plurality of locations that are addressable by the hardware processor 210 (and/or the network interface controller $230_1$) for storing the local data store 260, virtualization logic 270, the object classification logic 180 and the reporting logic 190. As optional logic, for deployments where the NAS 160 is not communicatively coupled to the intermediary network device 140 that handles a preliminary analysis, the NAS 160 may include static analysis logic 265. The static analysis logic 265 includes one or more software modules that, when executed by the hardware processor 210, analyzes features for an incoming object 120 (or metadata associated with the object 120). According to one embodiment of the disclosure, this analysis may be directed to features of the object 120 to determine whether the object 120 is "suspicious," namely there exists a certain level of likelihood that the object 120 is associated with a cyber-attack. The static analysis may include one or more checks being conducted on the object 120 (or its corresponding metadata) without execution of the object 120.

Examples of the checks may include signature matching by comparing at least a portion of the object 120 with one or more pre-stored signatures (pre-configured and predetermined attack patterns) from signature database (not shown). Another check may be used to uncover deviations in messaging practices (e.g., non-compliance in communication protocols, message formats or ordering, and/or payload parameters including size). Yet another check may involve (i) heuristics or (ii) determinative rule-based analysis as described above.

Based at least in part on static analysis of the object 120 by the static analysis logic 250 and/or the intermediary network device 140, upon determining that the object 120 is "suspicious," this suspicious object 120 (e.g., a portion or the entire analyzed object 120) is provided to a virtual environment 275, which is produced by the virtualization logic 270 upon execution by the hardware processor 210 for more in-depth analyses (e.g., behavioral analyses) of the object 120.

Figure 3:
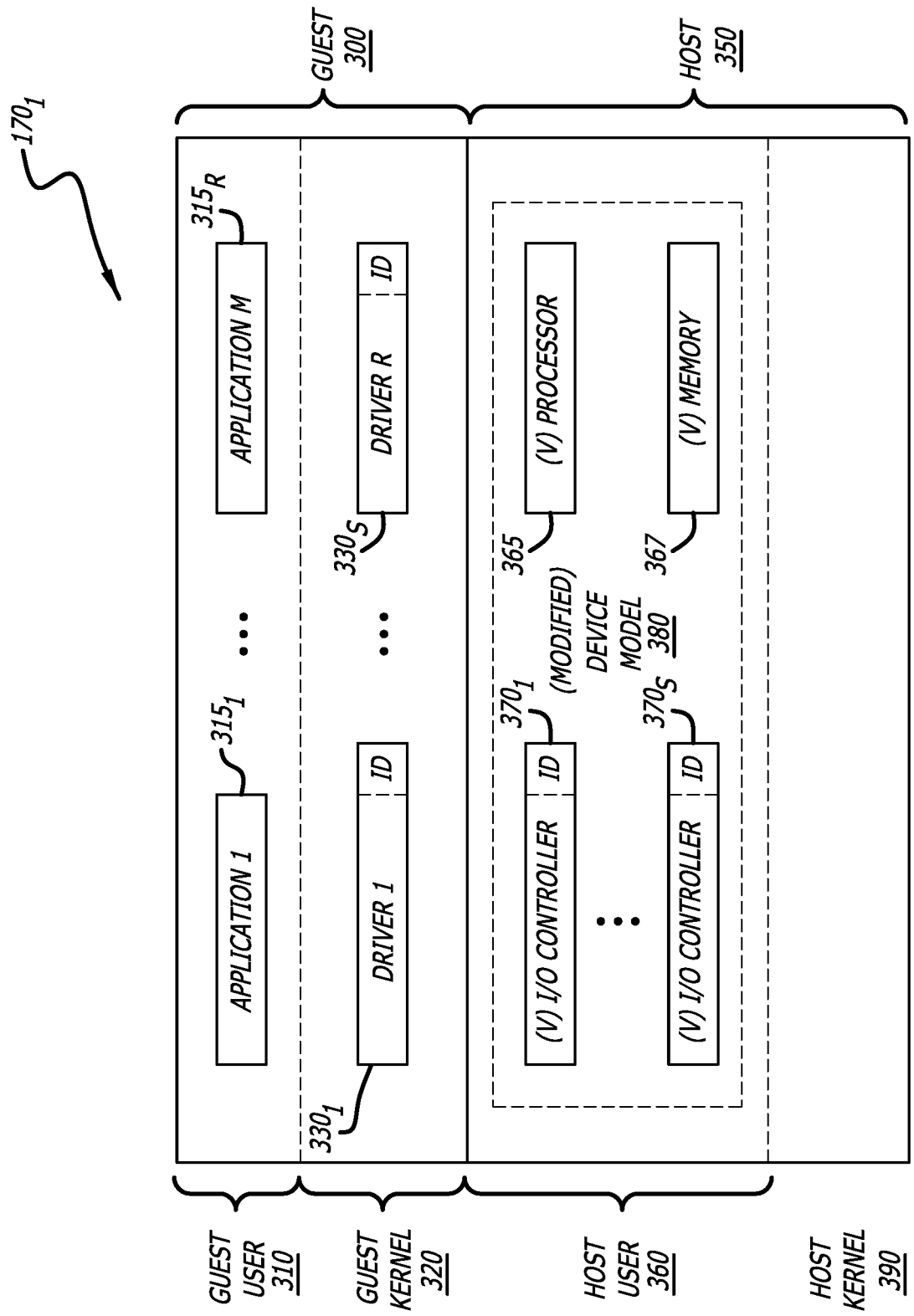
FIG. 3 is an exemplary block diagram of a logical representation of the operability of a virtualization of a selected network device operating as a virtual machine within the virtual environment of FIG. 2.

More specifically, the virtual environment 275 includes (a) one or more virtual machines (VMs) $170_1$-$170_N$, which are provisioned with a guest image (described below) to process the suspicious object 120 and (b) monitoring logic to monitor operations of the VM(s) $170_1, \ldots,$ or $170_N$ and/or suspicious object 120 during processing and store data representing the monitored operations (e.g., VM state information, etc.). In one embodiment of the disclosure, each VM $170_1 \ldots,$ or $170_N$ operates as a virtualized network device, including a guest system and a host system. The guest system includes one or more applications and an underlying guest operating system (OS) represented as the guest kernel software 320 of FIG. 3. The host system features a device model that includes one or more virtual hardware components. The virtual hardware components are accessible via software drivers normally within the guest OS. A logical representation of the VM $170_1$ includes guest system 300 and the host system 350 is shown in FIG. 3.

According to one embodiment of the disclosure, as shown in FIG. 2, the object classification logic 180 is configured to receive results from analyses of the suspicious object 120 within the VM(s). The VM-based results include information associated with the monitored behaviors associated with the suspicious object 120 and/or the VM(s). Based on the VM-based results, the object classification logic 180 classifies the suspicious object 120 as malicious or non-malicious. According to one embodiment of the disclosure, the object classification logic 180 comprises prioritization logic 280, score determination logic 285, and comparison logic 290.

The optional prioritization logic 280 may be configured to apply weighting to analysis results from the static analysis logic 265 (illustrated by dashed lines) and/or the VM-based results. Such weighting may be utilized by the score determination logic 285 in determination of a "score value." The score determination logic 285 analyzes the VM-based results and determines (i) a probability (i.e., score value) that the suspicious object 120 is associated with a cyber-attack and/or (ii) a suspected severity of the cyber-attack. The probability (score) may be included as part of the results provided to the reporting logic 190.

According to one embodiment of the disclosure, the score determination logic 285 may rely on a rule-based predictive model to determine the probability (score) and/or severity assigned to the suspicious object 120. Such information may be used in reporting for ordering of alerts, determining the medium or mediums of transmission of the alert from the reporting logic 190, the presentation style (e.g., font color, font size, selected image, etc.) used for the alert, or the like.

The comparison logic 290 determines whether the score value is equal to and/or exceeds a threshold value. If so, the suspicious object 120 is deemed malicious and information associated with the suspicious object 120 may be passed to the reporting logic 190. The reporting logic 190 is configured to receive information from the comparison logic 280 and generate alerts. An "alert" may include various types of messages that identify to a network administrator detection of a malicious object and a potential cyber-attack. The message types may include text messages and/or email messages, video or audio stream, or other types of information over a wired or wireless communication path, as described above.

Referring still to FIG. 2, the hardware processor 210 is a multipurpose, programmable device that accepts digital data as input, processes the input data according to instructions stored in its memory, and provides results as output. More specifically, as shown, the hardware processor 210 is configured to execute virtualization software modules 270 stored in the memory 220, which provides the virtual environment 275 (and VMs $170_1$-$170_N$) for behavioral analysis of objects uploaded via an I/O controller (e.g., network interface controller $230_1$) for testing. One example of the hardware processor 210 may include an Intel® x86 central processing unit (CPU) with an instruction set architecture. Alternatively, the hardware processor 210 may include another type of CPU, a digital signal processor (DSP), an ASIC, or the like.

III. Exemplary Logical Layout

Referring to FIG. 3, an exemplary block diagram of a logical representation of the operability of a virtualization of a selected network device operating as a virtual machine (VM) $170_1$ within the virtual environment of FIG. 2 is shown. The VM $170_1$ includes guest user software 310, guest kernel software 320, host user software 360, and host kernel software 390.

Guest user software 310 includes instances of one or more guest application $315_1$-$315_R$ (R≥1) running in their separate guest address spaces (sometimes referred to as "user mode processes"). Examples of these guest application instances $315_1$-$315_R$ may include a Portable Document Format (PDF) reader application or a data processing application instance. Depending on its type, the suspicious object 120 is processed by a particular guest application instance (e.g., guest application instance $315_1$) within the VM $170_1$, utilizing a guest kernel software 320 and virtual hardware components 365, 367 and/or $370_1$-$370_R$ (R≥2) within a device model 380 residing in the host user software 360.

As shown, according to this embodiment of the disclosure, the guest kernel software 320 includes a plurality of software drivers $330_1$-$330_S$, which operate to access and control virtual I/O controllers $370_1$-$370_S$ within the host user software 360. According to one embodiment, each software driver $330_1, \ldots$ or $330_S$ may uniquely correspond to a particular type of virtual I/O component $370_1 \ldots$ or $370_S$, respectively. Hence, to ensure proper communication paths, each software driver $330_1, \ldots$ or $330_S$ is assigned an identifier associated with a corresponding virtual I/O component $370_1, \ldots,$ or $370_S$. The physical I/O components are not in the communication path since the objects are processed within a self-contained environment so as to "sandbox" or isolate/quarantine malware that may be present. Therefore, any changes to an identifier in one of the virtual I/O components (e.g., virtual I/O component $370_1$) requires a corresponding change to an identifier within the software driver controlling access to the virtual I/O component $370_1$ (e.g., software driver $330_1$).

The host user software 360 includes the virtual hardware components, such as virtual I/O controllers $370_1$-$370_S$ (S≥1), where each virtual hardware component is recognized by software drivers. Given that each of the virtual hardware components (e.g., virtual I/O controllers $370_1$-$370_R$) is a code structure, the identifier assigned to certain virtual hardware components (e.g., virtual I/O controllers $370_1$, . . . , and/or $370_R$) may be altered to represent itself as a different virtual component, unlike physical hardware components having static (permanent) identifiers.

Figure 4:
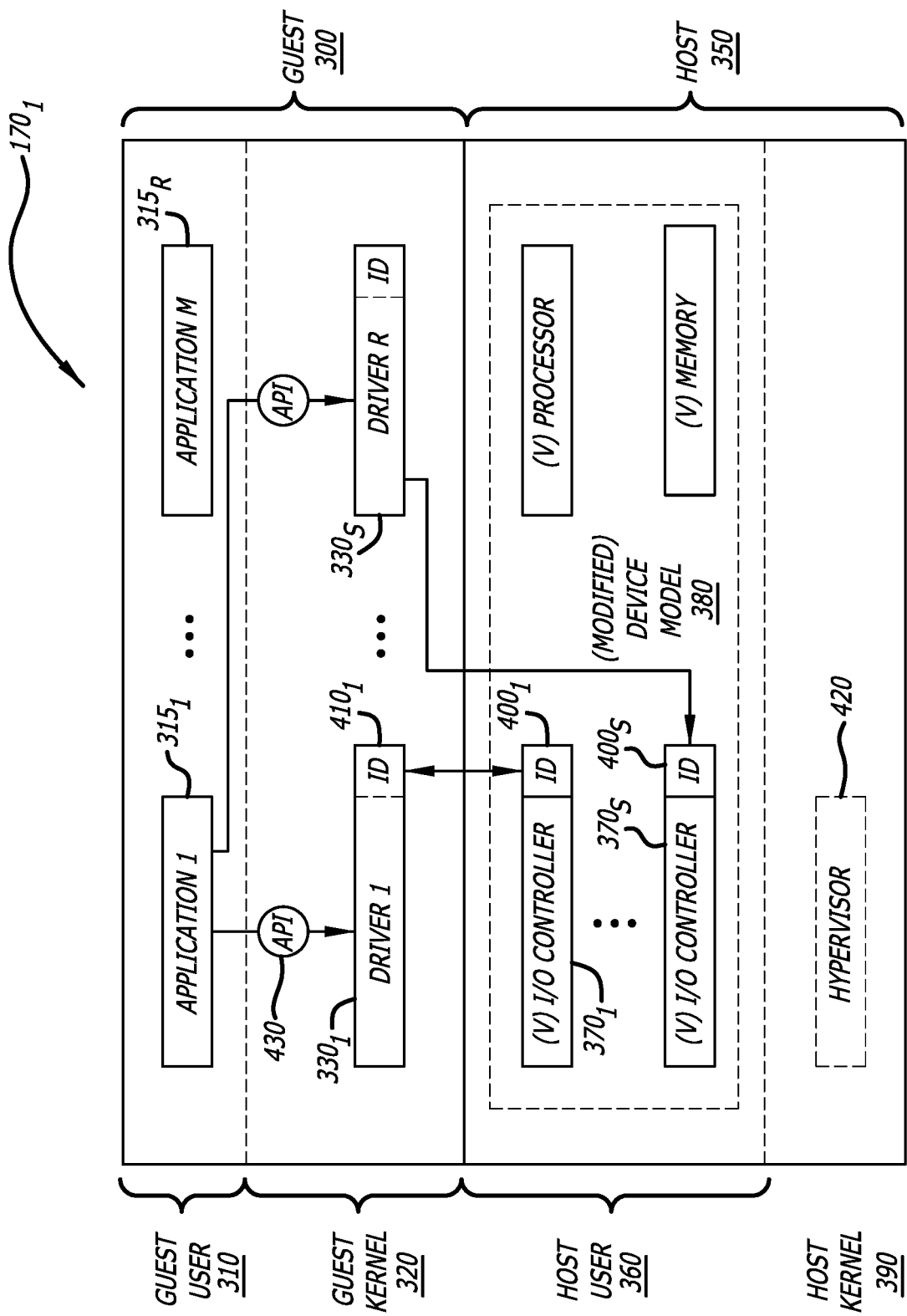
FIG. 4 is an illustrative embodiment of the operations conducted in accordance with a virtual machine configured with identifier-altered software drivers of a guest system and virtual hardware components of a host system of the virtual machine of FIG. 3.

Referring now to FIG. 4, an exemplary block diagram of a logical representation of the operability of the VM $170_1$ operating within the virtual environment provided by the virtualization logic 260 of FIG. 2 is shown. The VM $170_1$ includes the one or more guest instances $315_1$-$315_M$, the guest kernel 320 including software drivers $330_1$-$330_S$, and virtual I/O controllers $370_1$-$370_S$ that are accessed and controlled by the software drivers $330_1$-$330_S$, respectively. Each of the virtual I/O controllers $370_1$-$370_S$ is identified by an identifier $400_1$-$400_S$, where each identifier is unique for a particular type of virtual hardware component. For instance, as an illustrative example, a particular type of I/O controller manufactured by Company A is assigned a first identifier while another type of I/O controller manufactured by Company B is assigned a second identifier. These identifiers may be network-based identifiers (e.g., PCI identifiers), although other values may be used as described above.

More specifically, the guest image utilized by the VM $170_1$ deployed in the malware detection system may include a virtual I/O controller $370_1$ representing virtualization of a first, type of I/O controller (e.g., the Intel® SSD controller). However, to obfuscate the type of virtual I/O controller $370_1$ of the malware detection system 110, the code structure of the virtual I/O controller may be modified to include an identifier $400_1$ associated with another type of I/O controller (e.g., unusual or newly released Samsung® SSD controller). Stated differently, the identifier $400_1$ of the virtual I/O controller $370_1$ may be altered from its current value to a new value that corresponds to another I/O controller (recently released; not commonly deployed in Malware detection system; etc.). The location of the code structure within the virtual I/O controller may depend on the manufacturer and will be apparent to those of skill in the art. Also; it is contemplated that the modification may involve re-instantiating the virtual component with the substitute identifier instead of actively modifying a pre-existing identifier.

Additionally, given the change in the identifier $400_1$ associated with the virtual I/O controller $370_1$, the identifier $410_1$ associated with the software driver $330_1$, which controls and accesses the virtual I/O controller $370_1$, is also assigned and stored as the same identifier value as used by the virtual I/O controller $370_1$. The reassignment of the identifier $400_1$ associated with the virtual I/O controller $370_1$ to the software driver $330_1$ ensures a proper communication path between the guest kernel 320 and the virtual I/O controller $370_1$. The reassignment may be conducted by changing the value of the identifier within the driver code itself or within a driver configuration file accessed by the software driver $330_1$.

Although not shown in detail as the logical path between the software driver $330_1$ to a virtual I/O controller $370_1$ is shown, it is contemplated that communications between the software drivers $330_1$-$330_S$ and their corresponding virtual I/O controller $370_1$-$370_S$ propagate through a hypervisor 420 located within the host kernel 390. As an illustrative example, for communications between the software driver $330_1$ and the virtual I/O controller $370_1$, using an API 430, a request (e.g., system call) is initiated by a guest application (e.g., the guest application $315_1$) that is processing the object 120. As shown, the request is provided to the software driver $330_1$ via API 430. Responsive to the request, the software driver $330_1$ initiates a call to the hypervisor 420, and thus, provides information associated with the request to the hypervisor 420. The hypervisor 420, in accordance with the device model 380, retrieves the requested information from the selected virtual I/O controller $370_1$ of the device model 380. According to one embodiment, the virtual I/O controller $370_1$ is an emulation device object of the device model 380.

Thereafter, the modified identifier $400_1$ is retrieved from the virtual I/O controller $370_1$ and, in response to the call, is forwarded from the hypervisor 420 to the software driver $330_1$. Using the API 430, the modified identifier $400_1$ is returned to the guest application $315_1$ and the object (not shown) being processed by the guest application $315_1$. Hence, if the object is malware attempting to detect the I/O controller type in its determination as to whether or not to suppress or halt its operation, the actual virtual I/O controller type is hidden from the malware.

Additionally, to support actual connectivity by the virtual I/O controller $370_1$ to the network 130, where the virtual I/O controller $370_1$ operates as a virtualization of a network interface controller, the virtual I/O controller $370_1$ consists of two sub-components: a front-end and a back-end. The front-end, being the code interacting with the guest system (e.g., guest software driver $330_1$), mimics the functionality of (emulates) a known I/O controller. The back-end is code that uses host system services provided by the host operating system for a given I/O task. For instance, in the case of virtualized network controller, the back-end may open a socket on the host system 350 and read/write data to that socket. As a result, the particular type of NIC actually on the host is immaterial. Being positioned at the application level of the network stack, the back-end does not need or require the knowledge of the host hardware. It just accesses the network service the host OS puts in place.

Hence, in the case of a sandbox deployment, a socket is opened to connect a program running on the host system with the device model 380. More specifically, in response to a guest application $315_1$ attempting to output data to a network, the data is placed on the guest OS network stack (not shown). Subsequently, the data is removed from the stack by a particular guest software driver $330_1$ (e.g., guest OS NIC driver) and provided to the hypervisor 420. Thereafter, the hypervisor 420 provides the data to the device model 380, which in turn, routes the data to the program residing in the host system 350. This program is configured to timely respond to requests (data) coming from the guest application $315_1$ in supporting the virtualization and maintaining the guest OS network stack in a non-overflow condition. It is contemplated that the passing of the data between the device model 380 and the socket may be as network packets.

Figure 5:
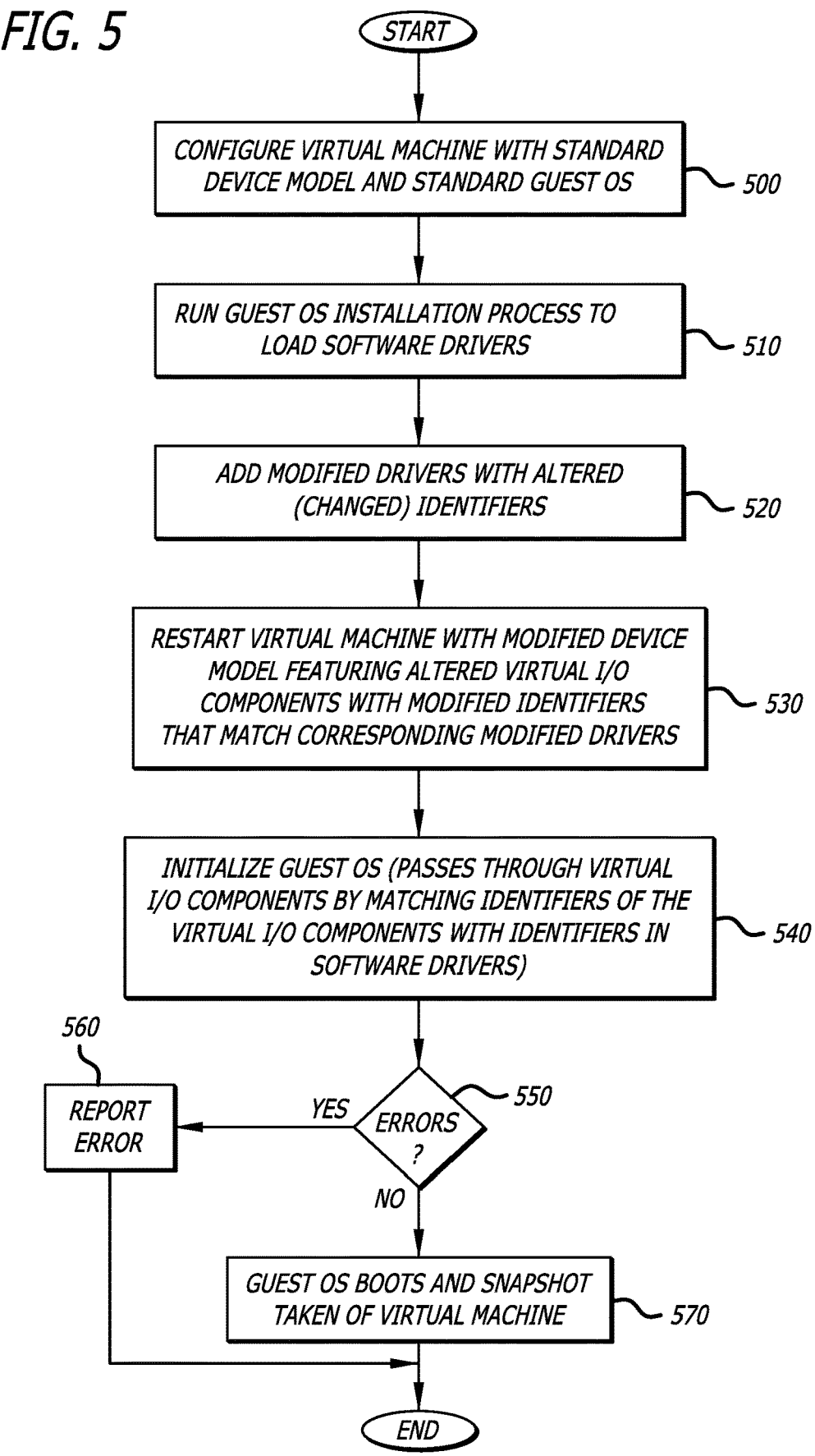
FIG. 5 is an illustrative embodiment of the operations conducted in accordance with the configuration of the virtual machine of FIG. 4.

Similarly, in the case of "live mode," instead of the socket being opened and connected to the program, the socket is opened and connected for routing to a live subnet setup on the host system 350 via a host NIC driver (not shown). Herein, as in the sandbox deployment, the back-end has no visibility as to the destination being a particular hardware NIC. Rather, the OS shields the application so that the guest application $315_1$ merely has knowledge of a network subnet/service being used to transmit and receive data to/from an external source, not the particulars associated with the hardware NIC. This supports compatibility independent of the NIC hardware type IV. VM Alliteration and Initialization Referring now to FIG. 5, an illustrative embodiment of the operations conducted in accordance with the configuration of the virtual machine of FIG. 4 is shown. Initially, in formulating a guest image, a virtual machine is initial configured with a standard (non-modified) device model and a standard (non-modified) guest OS (block 500). The "standard device model" includes virtual I/O components that are coded to perform one or more operations normally performed by existing physical hardware. These virtual I/O components are rarely updated given the complexity and costs associated with such updates. The standard guest OS (guest kernel) is the type and/or version of OS that operates with the virtual I/O component.

After the initial configuration, a guest OS installation process is run to load the software drivers into the guest OS (block 510). Also, software drivers with modified (substituted) identifiers are added to the guest OS (block 520). These modified identifiers are selected to be identical to new identifiers assigned to virtual I/O components that are part of a standard device model ("modified device model").

The virtual machine is restarted with the modified device model that includes the modified virtual I/O components with substituted identifiers that are identical to the modified software drivers added to the guest OS (block 530). After restarting the virtual machine, the guest OS is initialized with the modified virtual I/O components and the modified software drivers having matching identifiers (block 540). If any errors are detected after restarting of the VM, the errors are reported (blocks 550 and 560). If no errors are detecting, the guest OS boots and a snapshot (image) is taken to capture state information associated with the VM, including state associated with the modified virtual I/O components and their corresponding modified software drivers (block 570). The snapshot is used as the starting point for system operability with the modified device model.

Referring now to FIG. 6, an illustrative embodiment of the operations conducted by the virtual machine of FIG. 4 operating as part of the malware detection system of FIG. 1 and responding to malware analyzing the execution environment is shown. The VM is started in snapshot mode with the modified device model (block 600). At this time, the VM is started, where the virtual I/O components feature identifiers substituted to be different from the identifiers (PCI IDs) previously assigned to the virtual I/O components. Also, the guest OS includes the software drivers with modified identifiers that match these substituted identifiers. Once the VM is started and operational, an object is loaded to run on the VM (block 610). Responsive to the object requesting an identifier of one of the revised virtual I/O components, the substituted identifier of the revised virtual I/O component is returned to the object via the guest OS (blocks 620 and 630). Otherwise, until processing of the object is completed, the operations of the VM and/or object are monitored to determine whether the object initiates a query (e.g., system call, etc.) for an identifier of a hardware component (which is handled as a request for an identifier of the corresponding virtual hardware component within the VM).

In the foregoing description, the invention is described with reference to specific exemplary embodiments thereof. It will, however, be evident that various modifications and changes may be made thereto without departing from the broader spirit and scope of the invention as set forth in the appended claims. For instance, the selective system call monitoring may be conducted on system calls generated by logic outside the guest image.

What is claimed is:

1. A computerized method comprising:
provisioning a virtual machine in accordance with a guest image within a network device, the guest image including one or more virtual hardware components and at least a first software driver controlling access to a first virtual hardware component of the one or more virtual hardware components, wherein a pairing between the first software driver and the first virtual hardware component is maintained by configuring the first software driver with a first identifier that corresponds to the first identifier of the first virtual hardware component; and
responsive to processing of an object within the virtual machine that issues a request for an identifier of a hardware component within the network device, receiving the first identifier of the first virtualized hardware component that corresponds to a virtualization of the hardware component,
wherein the first identifier of the first virtual hardware component being an identifier substituted for a prior identifier of the first virtual hardware component before creation of the guest image and the first virtual hardware component is coded to function as a particular hardware component as identified by the prior identifier while the first identifier representing that the first virtual hardware component is a type of hardware component different than the particular hardware component.

2. The computerized method of claim 1, wherein the first identifier of the first virtual hardware component includes a Peripheral Component Interconnect (PCI) identifier.

3. The computerized method of claim 1, wherein the first identifier identifies the first virtual hardware component as a first type of virtual input/output (I/O) controller while the prior identifier identifies the first virtual hardware component as a second type of virtual I/O controller different than the first type of virtual I/O controller.

4. The computerized method of claim 3, wherein prior to the provisioning of the virtual machine in accordance with the guest image, the method further comprising:
generating the guest image with the first virtual hardware component by at least (i) modifying the first virtual hardware component by substituting the prior identifier of the first virtual I/O controller with the first identifier, (ii) modifying the software driver by substituting a prior identifier of the software driver with the first identifier;
restarting the virtual machine and initializing a guest operating system (OS) including one or more software drivers including the software driver so that the software driver locates and communicates with the first virtual hardware component; and
conducting a snapshot of the guest image including first virtual hardware component referenced by the first identifier and the software driver with the first identifier.

5. The computerized method of claim 4, wherein the first virtual hardware component is included as part of a host user software within the guest image and the software driver is included as part of a guest kernel software.

6. The computerized method of claim 3, wherein the first identifier identifies the first virtual I/O controller as a first type of network interface controller while the prior identifier identifies the first virtual I/O controller as a second type of network interface controller being different than the first type of network interface controller.

7. The computerized method of claim 3, wherein the first virtual I/O controller corresponds to a storage controller establishing communications with a storage device identified by the first identifier, the storage controller represented by the first identifier being different than a storage controller represented by the prior identifier.

8. The computerized method of claim 1, wherein the first virtual hardware component corresponds to a first virtual input/output (I/O) controller being a virtualization of an I/O controller.

9. A computerized method comprising:
configuring a device model for a virtual machine by modifying at least a virtual hardware component of one or more virtual hardware components, the modifying of the virtual hardware component comprises substituting a first identifier of the virtual hardware component that identifies the virtual hardware component as a first component type with a second identifier that identifies the virtual hardware component as a second component type different than the first component type;
installing a guest operating system including one or more software drivers for controlling access to the one or more virtual hardware components;
modifying at least a software driver of the one or more software drivers that controls access to the virtual hardware component, the modifying of the software driver comprises substituting the first identifier for the software driver with the second identifier for matching the modified virtual hardware component; and
generating a guest image including state information associated with both the modified virtual hardware component and the modified software driver.

10. The computerized method of claim 9, wherein the generating of the guest image comprises
restarting the virtual machine with the modified device model including the modified virtual hardware component;
initializing a guest operating system including the modified software driver; and
taking a snapshot to capture state information associated with the virtual machine to generate the guest image, the guest image includes state information associated with the modified virtual hardware component and the modified software driver.

11. The computerized method of claim 10, wherein the second identifier of the modified virtual hardware component corresponds to a Peripheral Component Interconnect (PCI) identifier.

12. The computerized method of claim 10, wherein the modified virtual hardware component corresponds to a virtual input/output (I/O) controller.

13. The computerized method of claim 12, wherein the modified virtual I/O controller corresponds to a network interface controller identified by the second identifier.

14. The computerized method of claim 12, wherein the modified virtual I/O controller corresponds to a storage controller establishing communications with a storage device identified by the second identifier.

15. The computerized method of claim 10, wherein the modified virtual hardware component is included as part of a host user software within the virtual machine and the modified software driver is included as part of a guest kernel software of the virtual machine.

16. A computerized method comprising:
producing a guest image for use by a virtual machine in processing an object, the guest image includes a guest operating system and a device model including one or more virtual input/output (I/O) components operating in combination with the guest operating system, wherein the producing of the guest image comprises
modifying the device model including modifying at least a first virtual I/O component of the one or more virtual I/O components to include an updated identifier that is changed from a prior identifier previously utilized by the first virtual I/O component, where the first virtual I/O component is coded to function as a particular I/O component represented by the prior identifier and the updated identifier representing that the first virtual I/O component is a virtualization of a type of hardware I/O component different than the particular I/O component, and
updating a software driver being part of the guest operating system that controls access to the first virtual I/O component to include the updated identifier of the first virtual I/O component; and
returning the updated identifier in response to a request for an identifier associated with the first virtual I/O component from a guest application running the object to prevent malware with the object from evading detection.

17. The computerized method of claim 16, wherein the updated identifier of the first virtual hardware component corresponds to a Peripheral Component Interconnect (PCI) identifier.

18. The computerized method of claim 16, wherein the updating of the software driver includes updating a driver configuration file accessed by the software driver.

19. The computerized method of claim 16, wherein the updating of the software driver includes updating code associated with the identifier of the first virtual I/O component.

20. The computerized method of claim 16, wherein the producing of the guest image includes booting the guest operating system and capturing state information associated with the virtual machine, including a state of the first virtual I/O component with the updated identifier and the software driver with the updated identifier.

21. A system comprising:
a processor; and
a memory communicatively coupled to the processor, the memory including one or more software module to perform operations, including
a first software module to provision a virtual machine in accordance with a guest image within a network device, the guest image includes one or more virtual hardware components and a software driver controlling access to a first virtual hardware component of the one or more virtual hardware components, wherein a pairing between the software driver and the first virtual hardware component is maintained by configuring the software driver with a first identifier that corresponds to the first identifier of the first virtual hardware component, and
a second software module that, responsive to processing of an object within the virtual machine that issues a request for an identifier of a hardware component within the network device, receiving the first identifier of the first virtual hardware component, the first identifier of the first virtual hardware component being an identifier substituted for a prior identifier of the first virtual hardware component before creation of the guest image and representing the first virtual hardware component as a type of hardware component, wherein the first virtual hardware component being coded to function as a particular hardware component identified by the prior identifier that is different than the type of hardware component identified by the identifier.

22. The system of claim 21, wherein the first identifier of the first virtual hardware component includes a Peripheral Component Interconnect (PCI) identifier.

23. The system of claim 21, wherein the first virtual hardware component corresponds to a first virtual input/output (I/O) controller.

24. The system of claim 23, wherein the first virtual hardware component is included as part of a host user software within the guest image and the software driver is included as part of a guest kernel software.

* * * * *